Jan. 1, 1952  H. M. HEUVER  2,580,428
CYCLOIDAL ROTOR FOR AIRCRAFT
Filed July 10, 1945  6 Sheets-Sheet 1

INVENTOR.
HERBERT M. HEUVER
BY
ATTORNEYS

Jan. 1, 1952

H. M. HEUVER 2,580,428

CYCLOIDAL ROTOR FOR AIRCRAFT

Filed July 10, 1945

INVENTOR.
HERBERT M. HEUVER
BY
ATTORNEYS

Jan. 1, 1952  H. M. HEUVER  2,580,428
CYCLOIDAL ROTOR FOR AIRCRAFT
Filed July 10, 1945  6 Sheets-Sheet 4

Fig 5

INVENTOR.
HERBERT M. HEUVER
BY
ATTORNEYS

Jan. 1, 1952  H. M. HEUVER  2,580,428
CYCLOIDAL ROTOR FOR AIRCRAFT
Filed July 10, 1945  6 Sheets-Sheet 5

INVENTOR.
HERBERT M. HEUVER
BY
ATTORNEYS

Patented Jan. 1, 1952

2,580,428

UNITED STATES PATENT OFFICE 2,580,428

CYCLOIDAL ROTOR FOR AIRCRAFT

Herbert M. Heuver, Dayton, Ohio

Application July 10, 1945, Serial No. 604,281

4 Claims. (Cl. 170—148)

(Granted under the act of March 3, 1883, as amended April 30, 1928; 370 O. G. 757)

The invention described herein may be manufactured and used by or for the Government for governmental purposes without payment to me of any royalty thereon.

This invention relates to aircraft and more particularly to cyclogiro aircraft and cycloidal propellers in which a combination of lift and propulsion forces are exerted by cycloidal motion of airfoil members or blades cantilevered transversely of the flight path, and constitutes an improvement of Patent No. 2,045,233 granted June 23, 1936, to K. F. J. Kirsten and myself.

Aircraft propellers such as are disclosed in the aforementioned patent and in Patents No. 1,432,700 and No. 2,090,052 issued to K. F. J. Kirsten are termed cycloidal propellers for the reason that the path followed by the longitudinal axis of any single blade closely approximates a cycloid. Since the blades are rotating about the transverse propeller axis through the aircraft and also moving forwardly with the aircraft the axis of each of the blades will follow a pure cycloidal curve only if the propeller axis of rotation or orbital axis of the blades advances during one revolution of the propeller an amount equal to the circumference of the propeller or pi times the diameter. This translation advance per revolution of the propeller is termed the pitch, just as the pitch ratio of a screw propeller is defined as the advance per revolution in propeller diameters of the screw propeller at zero slip. In order to serve as an efficient aircraft propulsion means and also stay within a reasonable maximum diameter, the cycloidal propeller should operate in normal flight under conditions wherein each blade axis follows a prolate cycloidal path with respect to the earth's surface. That is, a path as followed by a point on the rim of a small wheel mounted concentrically of a large wheel with the large wheel rolling along a plane surface. In such a case the pitch or advance per revolution of the propeller is considerably more than pi times the diameter of the propeller. The present invention relates to improvements in cycloidal propellers and particularly cycloidal propellers which are intended to follow prolate cycloids during normal flight.

In order to provide a cycloidal propeller capable of sustaining an aircraft and propelling it forwardly the propeller blades must have an angle of attack with respect to the windstream direction in each position of each propeller blade such that a resultant force is produced which is capable of furnishing the necessary lift and thrust components required by any particular flight condition. These requirements are such that an oscillatory or rotary motion must be imparted to the individual blades so that at each position throughout a revolution of the propeller each blade will furnish its share of lift and thrust. Of course the aerodynamic considerations of any particular blade will vary constantly throughout a revolution of the propeller because of the combined rotary and translatory movement of the propeller as the aircraft is flown.

In the prior art constructions, such as Patent No. 2,045,233, the change in pitch or advance per revolution of the propeller has been accomplished by an eccentric mechansim which superimposes its effect on a constant velocity drive for rotating the blades about their own longitudinal axes. The mechanical difficulties arising from inertia forces and vibration due to the magnitude of the eccentricity and large acceleration in satellite velocity required over certain ranges of the blade cycle have made the attainment of an aircraft capable of slow forward speed impossible and it is accordingly a primary object of the invention to provide a pitch changing mechanism for producing the necessary blade oscillation with a minimum of vibration and to reduce as far as possible the angular acceleration of the blades in certain ranges of movement about the orbital axis of the blades, so that the instant centers of the blade axes lie along the mechanical axis of symmetry of the propeller at spaced points rather than at a common point as required from purely geometric pitch considerations.

Other objects and features of my invention will be apparent from the detailed description which now follows with reference to the appended drawings, in which:

Fig. 3 is a perspective showing of the rotor structure;

Fig. 4 illustrates details of one of the spindles for supporting a cantilevered blade;

Fig. 5 is a view of a portion of the elements of mechanism A;

Figs. 6a and 6b are diagrammatic illustrations of the mode of operation of my pitch producing mechanism.

Fig. 8 is an end view of the mechanism for adjusting the angle of attack of the blade.

Figures 1A, 1B, 1C:
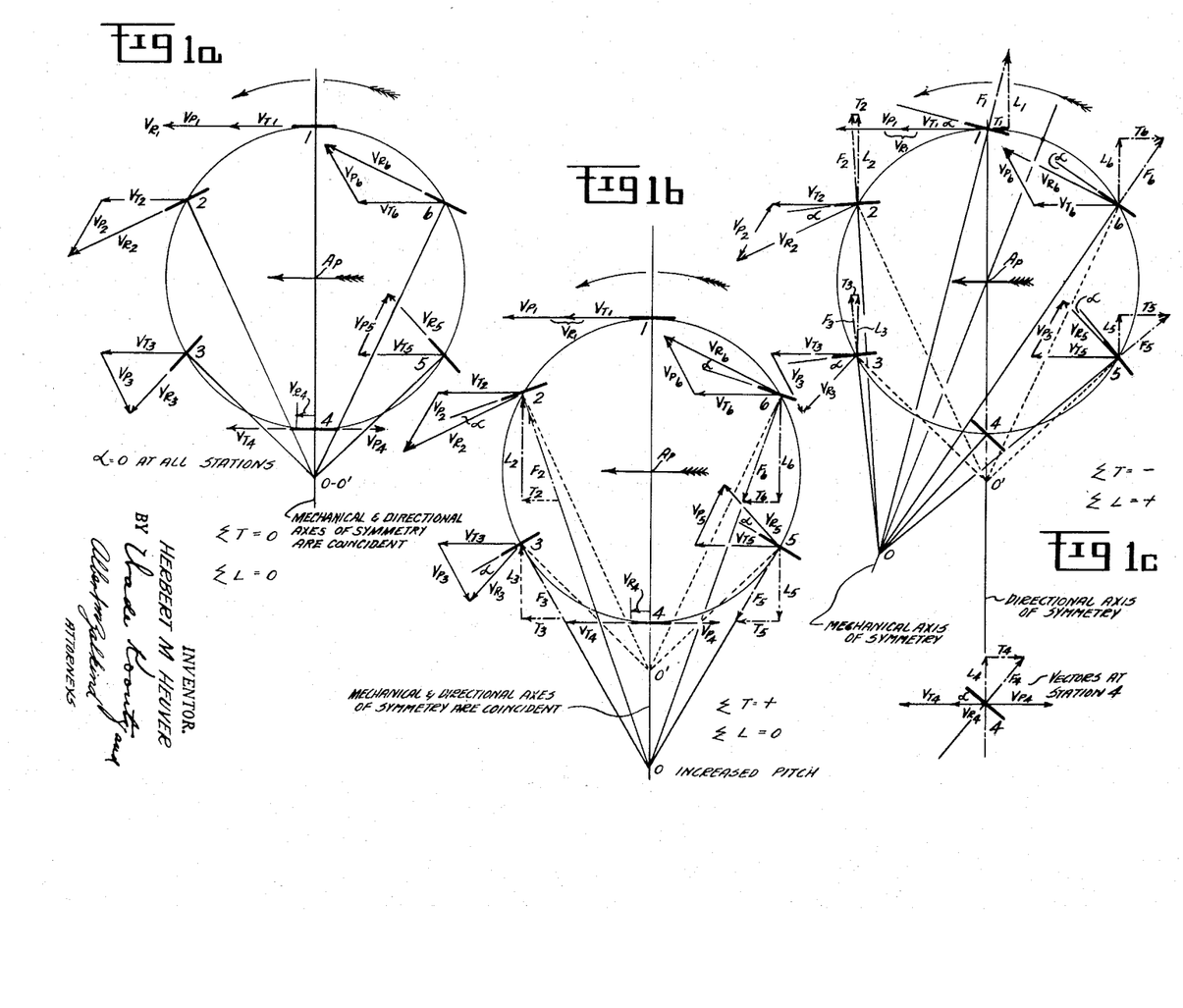
Figs. 1a, 1b and 1c are vector diagrams of cycloidally moving airfoils for the purpose of illustrating the aerodynamic theory of such devices.

The fundamental vector relationships of a cycloidally moving blade are illustrated in Figs. 1a, 1b and 1c, the orbital and translational motion of the blades being indicated by large arrows in the respective directions. Each of these figures shows a symmetrical blade, symbolized by the chord thereof, in six successive positions or stations (numbered 1–6) in its orbital path about the propeller axis $A_p$. The blade revolves geometrically about an instantaneous center O on the mechanical axis of symmetry which is a line determined by the point O and the center $A_p$ of the orbit circle. The blade axis is provided with pure cycloidal motion as it translates in the direction indicated by the velocity vectors $V_t$ by virtue of the motion of the aircraft and simultaneously rotates about the center $A_p$ of the orbit circle as indicated by the peripheral velocity vectors $V_p$, by virtue of rotation of the propeller. In addition to the mechanical instantaneous center of rotation there is also an aerodynamic or directional instantaneous center of rotation which is the point O' in these figures and is the point of intersection of normals from the several resultant velocity vectors $V_r$, all vectors being with respect to the axis of the blade at the several stations and carrying numerical subscripts corresponding thereto. The instantaneous center O' and the center of the orbit circle $A_p$ determine a line which is termed the aerodynamic or directional axis of symmetry of the rotating system and is always perpendicular to the line of flight. In Figs. 1a and 1b the mechanical axis of symmetry and the aerodynamic axis of symmetry are each vertical and coincidental, whereas in Fig. 1c an angular displacement therebetween is shown. With particular reference to Fig. 1a the points O and O' are seen to coincide and for this condition the resultant velocity vectors $V_r$ at each station are in the direction of the blade chords. Accordingly, disregarding drag effects, no thrust or lift force is exerted by the blade at any station in Fig. 1a. In Fig. 1b, however, the mechanical instantaneous center O has been shifted so that the blade now has an angle of attack alpha with respect to the resultant velocity $V_r$ at each station, the value of alpha varying from station to station. This change in alpha will in the present case result in an increase in pitch. The value of alpha at each station is a function of the satellite velocity of the blade with respect to its angular velocity about the rotor orbit. In other words, since the blade, in effect, is seen to oscillate about its own axis through one cycle as it revolves once about the propeller axis, the value of alpha is a function of the magnitude of oscillation. Alpha is also a function of the phase of oscillation, the phase being with respect to the position of the blade in the orbit circle and is dependent on the angle between the mechanical axis of symmetry and the direction of translational motion as described below. The introduction of the angle of attack effects a force F on the blade which resolves into lift and thrust components L and T, having numbered subscripts corresponding to stations on the diagram (Fig. 1b). The displacement of the center O from the center O' gives a pitch to the propeller such that the vectors add up to give a net forward thrust as signified by the plus sign for summation T on the drawing, whereas the lift components L add up to zero. In other words, the propulsive force of the cycloidal propeller is in the direction of translation of the aircraft, i. e., the flight path, for the case shown in Fig. 1b. In Fig. 1c the mechanical instantaneous center O has been angularly shifted with respect to the position shown in Fig. 1b, which results in a change in phase of the blade oscillation with respect to the several stations in the orbit circle, the blade assuming an attitude at each station such that the thrust components T add up to a negative quantity as signified by the minus sign, and the lift components L add up to a positive quantity. This negative thrust condition represents an extreme case and theoretically would result in slowing down of the propeller and aircraft at the instant represented. On the other hand, if the aircraft were towed as a glider, a negative thrust would be produced which would cause auto-rotation of the propellers. The condition shown in Fig. 1c illustrates the extent of variation in force direction which may be obtained by shifting the mechanical axis of symmetry, although under practical flying conditions the actual extent of shifting of this axis would not ordinarily be beyond the extent where positive thrust ceases to exist. In other words, the practical limit of angular position of the point O is somewhere between the positions shown for that point in Figs. 1b and 1c.

Figure 2:
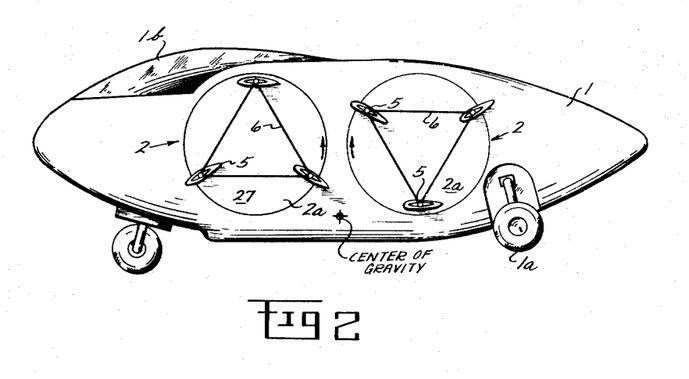
Fig. 2 is a side view of the exterior of my cycloidal airplane.
Figure 2A:
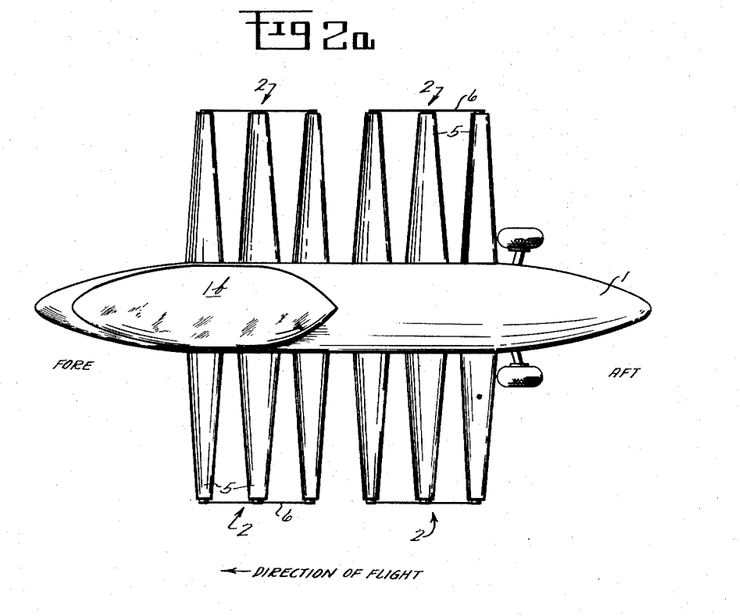
Fig. 2a is a plan view thereof.

Attention is now invited to Figs. 2 and 2a which disclose a fuselage 1 which may be of any suitable construction, such as semi-monocoque, and is shown in the present case as being provided with landing gear 1a and a transparent canopy 1b. At the sides of fuselage are flush mounted fore and aft contra-rotational pairs of cycloidal propellers 2, contra-rotation being provided to effect torque balance. Each propeller comprises a rotor 2a and three cantilevered blades 5 rotatively mounted on axes 120° apart. The blades 5 are of equal size and preferably cross sectionally symmetrical in a chordwise sense. They are arranged with respect to the distributed weight of the aircraft so as to provide balanced aerodynamic effects fore and aft and left and right of the aircraft in normal flight. Bracing cables 6 may be utilized at the tips of the blades, if so desired, but one of the novel features of my invention, as will hereinafter be disclosed, provides sufficiently rigid support internally of the blades to warrant elimination of auxiliary bracing.

The two pairs of propellers are disposed in fore and aft relation with respect to one another and the separate propellers of each pair are coaxially mounted. Each of the propellers is provided with a mechanism A (see Fig. 5) for varying the mechanical axis of symmetry and pitch setting of the propellers during flight of the airplane. Operation of the various parts of the mechanism A is accomplished by manual control elements inside the airplane fuselage and accessible to the pilot of the airplane.

Figures 3, 4, 5A, 8:
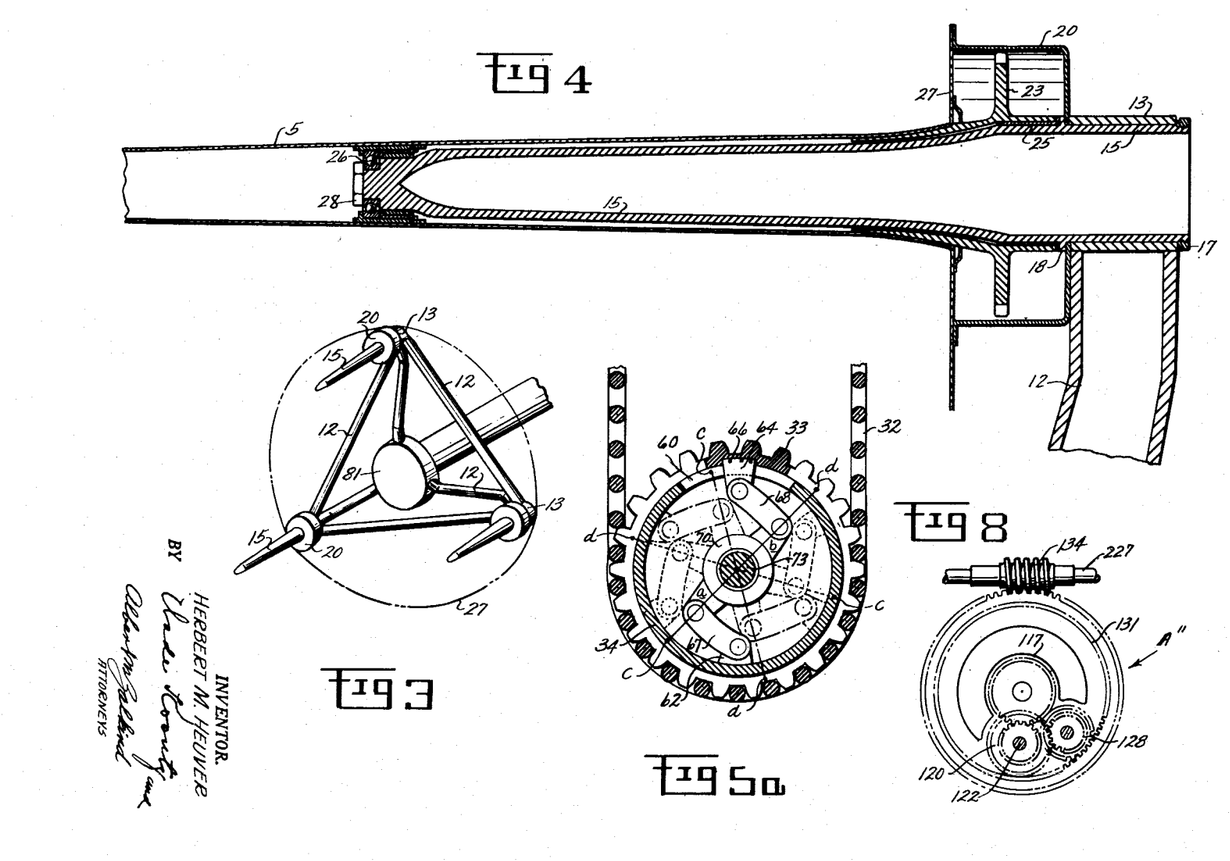
Figure 5:
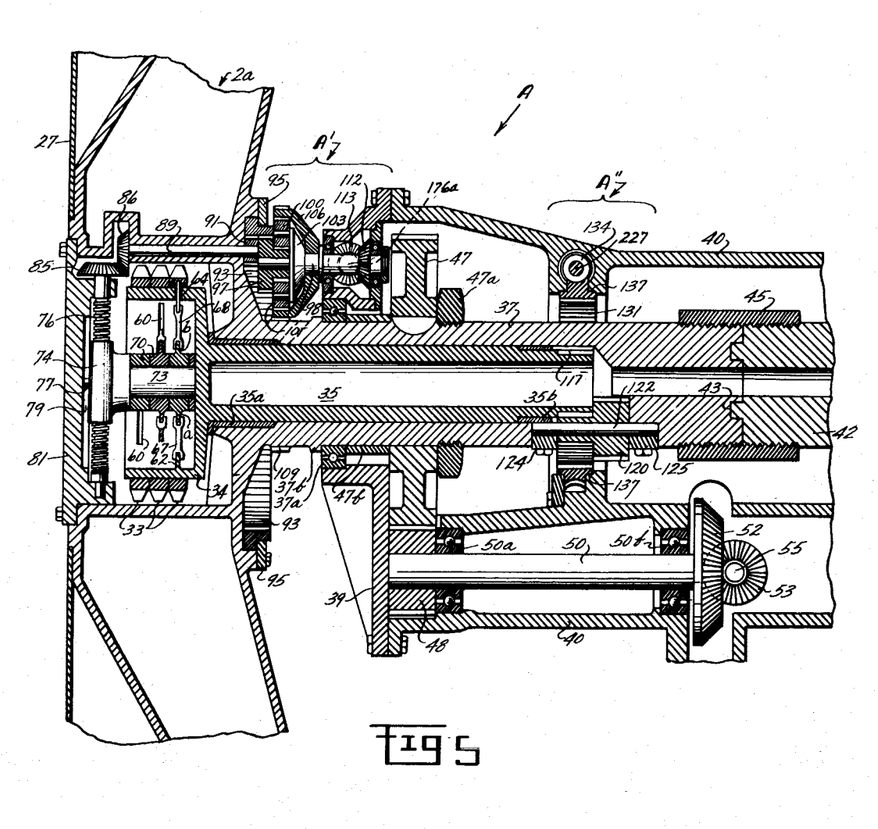
Fig. 5 is a longitudinal section through one of the mechanisms A associated with each rotor.

With reference to Figs. 3, 4 and 5, the rotors 2a are formed of tubing 12 joined as by welding to form the fabricated structure shown in Fig. 3. A collar 13 is formed at each region of intersection of the tubes 12 and a spindle 15 is supported in the collar, being held stationary therein by a nut 17 against a flange 18 formed integrally with the spindle. A cup 20 having suitable apertures (not shown) for passage of a chain belt therethrough is clamped between collar 13 and flange 18 and houses a sprocket wheel 23 rotatively mounted by bearing 25 on spindle 15 and integrally secured to blade 5 by means of a tapering sleeve 23'. The exterior rims of cups 20 are in the same plane and a facing disc 27 is secured to the rims to effect a smooth exterior surface for the whole structure, the discs 27 being adapted for flush mounting with the fuselage skin, as will be understood by reference to Figs. 2 and 2a. The tubing structure for the rotor is very rigid and divides stresses substantially equally among the three tubes forming each intersection. Each spindle 15 extends a substantial distance into the interior of its respective blade so as to give considerable cantilever support through the relatively small bearing 26 (Fig. 4) secured on the outer extremity of the spindle by means of a retaining nut 28.

With reference to Figs. 4, 5, 5a and 6a each sprocket wheel 23 is provided with a sprocket chain 32 which engages a relatively stationary sprocket wheel 33 of the same diameter as wheels 23 (Figs. 5a and 6a), there being three such wheels 33 provided coaxially in the mechanism A, as shown in Fig. 5, and supported rotatively on the expanded cup-like end 34 of a shaft 35. It will be understood that each wheel 23 is in the same plane as its coacting wheel 33, hence the wheels 23 do not lie in the same plane but are disposed at different points axially within the respective cups 20 (Fig. 4). Shaft 35 is normally stationary and is supported in bearings 35a and 35b in a hollow tubular extension 37 of rotor 2a, the extension 37 being operative to rotate rotor propeller 2 and being rotatively supported in a bearing 37a. Bearing 37a abuts a flange 37b on shaft 37 and is secured to an apertured cover plate 39. Plate 39 is integrally secured to a fixed cylindrical housing member 40, and two housing members 40 are provided, extending between the left and right rotors of the fore and aft pairs. Within each housing 40 the tubular extensions 37 (Fig. 5) are suitably coupled in an integral manner through an intermediate shaft 42 by means of splines 43 and a threaded collar 45 so that for all practical purposes the shafts 37 in each housing 40 are aligned and extend as an integral member between the left and right rotors of the fore and aft pairs. This laterally continuous construction of the housings 40 and shafts 37 provides a very strong structure for supporting the fore and aft pairs of propellers and permits the use of relatively small bearings 37a. Rotational power is supplied to the rotors through their respective shafts 37 by means of a gear 47 keyed thereto and secured by a nut 47a and collar 47b which abuts bearing 37a. Gear 47 engages a pinion 48 which is rotated by a shaft 50 supported in suitable bearings 50a and 50b. Shaft 50 has a bevel gear 52 keyed thereto which engages a bevel pinion 53 to which power is applied from the engine through a shaft 55. The power shaft 55 is continuous and is adapted to pierce both of the housings 40 so as to supply power to both pairs of rotors, but it will be understood that pinions 53 are so arranged relative to gears 52 as to provide contra-rotation of the propeller pairs in the directions shown in Fig. 2.

The mechanical system including the relatively stationary sprocket wheels 33 at the center of each propeller 2, the sprocket wheels 23 secured on the propeller blades 5 and the continuous drive chains 32 connecting respective pairs of sprocket wheels (see Fig. 6a) provides means to rotate the blades one revolution for each revolution of the propeller, the connected wheels 23 and 33 being of equal diameter as noted above.

With reference to Figs. 5 and 5a, the mechanism for actuating the blades is contained within the expanded cup-like end 34 of shaft 35. Cup 34 is provided with three slots 60 having midpoints spaced 120° apart and which are axially separated so that each slot is disposed underneath a sprocket wheel 33 as shown. Each midpoint of the slots 60 diametrically faces a lug 62 formed of the material of cup 34 and a lug or tongue 64 protrudes through each slot 60 and is secured in a recessed groove milled in the material of the encompassing sprocket wheel 33, being secured thereto in any suitable manner as by screws 66. The lugs 62 and 64 are provided with bores at their extremities and are connected by means of similar links 67 and 68, respectively, to the arms $a$ and $b$, respectively, of levers 70, there being one such linkage and lever system associated with each wheel 33. The effective lengths of links 67 and 68 are equal, as are the effective lengths of the arms $a$ and $b$ of the levers 70. The levers 70 are all rotatably mounted on a common cantilevered pin or shaft 73 integral with a nut member 74 adapted to ride up and down on a screw 76. The pin 73 is guided for translational motion by a pin 77 integral with nut 74 and slidably disposed in a diametrical slot 79 milled into a circular cover plate 81 which is secured axially to the rotor. A gear train mechanism A' is provided for adjustably setting the pitch of the blades by rotation of the screw 76 so as to cause the nut 74 to ride up and down to a predeterminable position at the will of an operator in a manner to be later described, thereby providing eccentricity of pin 73 relative to the axis of the propeller, which imparts a crank pin motion to pin 73 and effects through levers 70 and the links 67 and 68 a rotational oscillation of sprocket wheels 33 as the respective propeller revolves. The action of each system comprising a lever 70 and related links 67 and 68 is such that pin 73 and a pair of imaginary points $c$ and $d$ in each system always remain in approximately a straight line. The point $c$ is normally fixed with respect to the aircraft and the point $d$ is always fixed with respect to its respective sprocket wheel 33. The line defined by these points pivots to and fro about point $c$ in the plane of the paper whenever pin 73 is eccentrically displaced and accordingly the levers 70 and the related respective links may be regarded as defining straight line mechanisms in the sense that the center of the levers, i. e., pin 73, has an approximate straight line motion with respect to a pair of points $c$ and $d$ in each lever system, as will be hereinafter more graphically described in connection with Figs. 6a and 6b.

It will be noted that the linkage including links 67, 68, 70 and eccentric pin 73, is such that the angular rotation of the sprocket wheel 33 about the axis of its support 34 is a function of the angular throw of the eccentric pin 73 so that eccentricity required to obtain the necessary sprocket oscillation in low pitch is reduced as much as one-half which greatly reduces the inertia forces and makes it possible to attain lower effective rotor pitch settings than can be attained with mechanism known in the prior art.

It will be apparent that if the axis of pin 73 is shifted so as to be concentric with the rotor and sprocket 33 axis, the sprockets 33 would remain stationary and the blades would rotate once around their own axes for each rotor revolution and the blades would remain parallel to each other, corresponding to the condition of infinite geometric pitch. As the eccentric pin 73 is shifted from its central or neutral position, however, the sprockets 33 will begin to oscillate with the magnitude of the oscillation increasing with increase of eccentricity so that the resultant satellite motion of the blades will be a composite of uniform rotary motion and an oscillating motion causing a variable satellite motion so that the theoretical blade path is along a cycloidal curve. It will be apparent by reference to Fig. 1b, that as the geometric pitch is reduced the oscillation of the blades must be increased, which requires that the eccentricity of pin 73 must be increased as the pitch is reduced.

The lever and linkage structure has the unique effect of providing almost pure cycloidal motion at high pitches, as will be understood from consideration of Figs. 5 and 5a wherein pin 73 is shown as axially aligned with the rotor axis, i. e., no eccentricity is provided, which corresponds to a condition of infinite pitch and causes one complete rotation of uniform angular velocity of each blade about its own axis with respect to the rotor as it traverses the orbit thereof. At infinite pitch the acceleration forces in the blades are zero since with respect to the airplane the blades have no satellite rotation, or in terms of Figs. 1a, b and c the center O is at infinity; i. e. the blades are always parallel to each other. However, as the mechanism A' is actuated to effect eccentricity of shaft 73, the pitch is reduced and acceleration stresses in the blades and in the linkage and lever structure as well as in the sprocket wheel and chain elements are introduced due to the shortening of the radii to the mechanical instantaneous center as the pitch is decreased, as may be seen by comparison of Figs. 1a and 1b. Also, stresses are introduced by the fact that at less than infinite pitch the blade must undergo a reversal of inclination, with respect to the airplane at two points spaced 180° apart on the rotor circle, the precise points depending on the intersection of the mechanical axis of symmetry with the orbit circle. The lower the pitch the greater is the extent of reversal in a given time and hence the greater the acceleration forces. It may now be appreciated that at the high pitches used in normal cruising these forces are small due to the almost uniform angular velocity of the blades about their own axes, but at lower pitches, as at take-off or in hovering flight, the forces present a serious stress problem. However, the mechanism described above operates to reduce the peak accelerations but maintains approximately the same average, in a manner which will be better understood from consideration of Figs. 6a and b and Figs. 7a, b and c in conjunction with the explanation which now follows.

Fig. 6a shows the rotational configuration of the cycloidal propeller at a particular instant. Reference characters as used in Fig. 5 are found in Fig. 6a to denote like parts, namely, eccentric pin 73 and guiding groove 79 and the centrally located sprocket wheels 33, the sprocket chains 32 being also indicated. For the instant under consideration, the blades 5 are assumed to be in the position shown and the Roman characters I, II and III denote the three blade systems which comprise the propeller, and elements of these systems will be hereinafter referred to accordingly. It will be noted from Fig. 6a that the blades II and III have chords which always have a common point of intersection with a normal to the chord of blade I, the normal being in the plane of the axis of that blade. This relationship is provided for in assembly in a manner to be hereinafter described and it is by virtue of such relationship that a change of pitch changes the blade angles in such a manner that geometrical symmetry of the three blades always exists so that there is no change in the mechanical or directional axes of symmetry of the propeller. In other words, a change of pitch merely varies the point of intersection of the chords of blades II and III, the point of intersection shifting up or down on the normal to the chord of blade I as the pitch is changed, so that the change in angle of attack of the blades is symmetrical whereby the propulsive force of the propeller is affected only in the direction of the existing flight path as will now be made more apparent in discussion of Fig. 6b and Figs. 7a through c.

Fig. 6b shows the blades I, II and III oriented so as to correspond with their counterparts in Fig. 6a for the instant shown, although owing to space limitations on the drawings, blades II and III are not angularly related to their respective mechanisms in an orbital sense. A mechanical arrangement is disclosed in each system (Fig. 6b) comprising a forked lever 80 which is the equivalent of the lever 70 and the related link mechanism previously described in connection with Figs. 5 and 5a. Each forked member 80 is pivoted at a point c' in its respective system, the point c' being normally fixed relative to the aircraft. Each point c' corresponds to a point c of Fig. 5a, the points c' being similarly spaced 120° apart. A pin d' corresponding to any point d of Fig. 5a is secured to each wheel 33 and coacts slidably with the sides of the slot in the respective member 80. In conformity with the construction shown in Figs. 5 and 5a the eccentric pin 73 is adjustably positionable along groove 79, pin 73 being slidably disposed in each slot of the three members 80 and being shown at the particular instant at a point in the eccentric circle whereat the members 80 assume the positions illustrated, the arrows on wheels 33 indicating the direction of oscillatory rotation at the instant in system I, and as about to begin in systems II and III. Since each member 80 is by construction constrained to pivotal motion about a respective point c' it is mechanically equivalent to the straight line mechanism of Figs. 5 and 5a, wherein the points c, d and the pin 73 are at all times in approximate alignment, the line defined thereby being pivotal about the respective point c for each blade system, all as heretofore described. Thus, it will be seen in Fig. 6b that pivots c', d' and 73 provide a theoretical mechanical equivalent of the lever and linkage mechanism in each blade system. The systems I, II and III of Fig. 6b operate in such a manner that as the propeller is rotated counterclockwise, all the blades rotate therewith as does the eccentrically disposed pins 73, the latter revolving about the propeller axis as indicated by the dot-dash circle and in a direction indicated by an arrow tangent thereto in each system. This rotary motion of pin 73 produces an oscillatory motion of each member 80 about its respective pivot c', and as in the previous case (Figs. 5 and 5a) the magnitude of oscillation depends upon the predetermined extent of eccentricity of pin 73 relative to the propeller axis, the greater the magnitude of oscillation the lower the pitch of the propeller. Particular attention is now called to system I in Fig. 6b which shows the slot in member 80 lined up with groove 79 so that the axis of the groove and the slot, as well as pivots c', d' and pin 73, are all aligned normal to the chord of the respective blade and intersecting the chord at the transverse axis thereof. In this condition the acceleration forces in the mechanism and in the blade are at a minimum. By comparison with system II (Fig. 6b) it will be seen that the dot-dash line X—X corresponds to the same minimum acceleration condition, showing that when pivots c', d' and pin 73 are aligned diametrically the acceleration forces on the respective blades are at a minimum, and similarly in system III the line Y—Y indicates the position of the member 80 therein for minimum acceleration. It should be noted, however, that only in system I is the alignment of member 80 normal to the blade chord in minimum acceleration condition. These positions of members 80 for minimum acceleration are important in that they enable a relationship between the mechanism and the blades to be obtained such that a condition of symmetry of the blades is effected. The symmetrical result is achieved by first setting up the relationship shown in system I so that the pivots c', d' and pin 73 are aligned normal to the blade when the blade is tangent to the orbit circle. For convenient illustration, the position of the axis of blade I will be assumed to be as shown in Fig. 6a although the perpendicular relationship with member 80 may be obtained anywhere on the orbit circle and is not limited to the specific orientation shown on the figures of the drawing. It will be noted that the mechanism of the three systems are interrelated so that, assuming system I has been set up as shown, a 120° counterclockwise rotation of the propeller will automatically bring the axis of member 80 of system III into coincidence with the line Y—Y whereas a further 120° counterclockwise rotation will automatically bring the member 80 into coincidence with the line X—X (note system II). Accordingly, after system I has been set up, the propeller is rotated 120° counterclockwise so that the member 80 of system III assumes the position indicated by the line Y—Y. The axis of blade III will then be at the point shown for blade I (Fig. 6a) at which time blade III may be oriented by slipping the respective sprocket chain, or in any other suitable manner, so as to be tangent to the orbit circle at that point. The blade of system III will then be in the identical juxtaposition previously had by blade I with relation to the orbit circle, which latter blade is now 120° away in a counterclockwise sense, i. e., its axis is now at the point shown in Fig. 6a for blade II. System III having been set up, similarly the blade of system II is disposed in turn tangent to the orbit circle after another 120° counterclockwise rotation of the propeller at which time member 80 of system II is in the position of minimum acceleration as indicated by the line X—X and blade II is in the identical juxtaposition shown for blade I in Fig. 6a. With the blades and their respective mechanisms set up as just described, a condition of symmetry is obtained such that each blade assumes the position shown in systems I, II and III of Fig. 6a successively as it revolves about the propeller axis. Furthermore, for any change in eccentricity of pin 73 only the magnitude of oscillation is affected, that is at any particular point in the orbit all of the blades will be disposed at the same angle relative to the mechanical axis of symmetry. The foregoing demonstrates the effect obtained with the structure shown in Figs. 5 and 5a wherein an identical method of successively setting the blades tangent to a selected point on the orbit is utilized, the positions of minimum acceleration of the several lever and link systems being obtained by instrument measurement or in any other suitable manner, the points c, d and pin 73 being diametrically aligned in each system at the time of minimum acceleration therein.

Figures 7A, 7B, 7C:
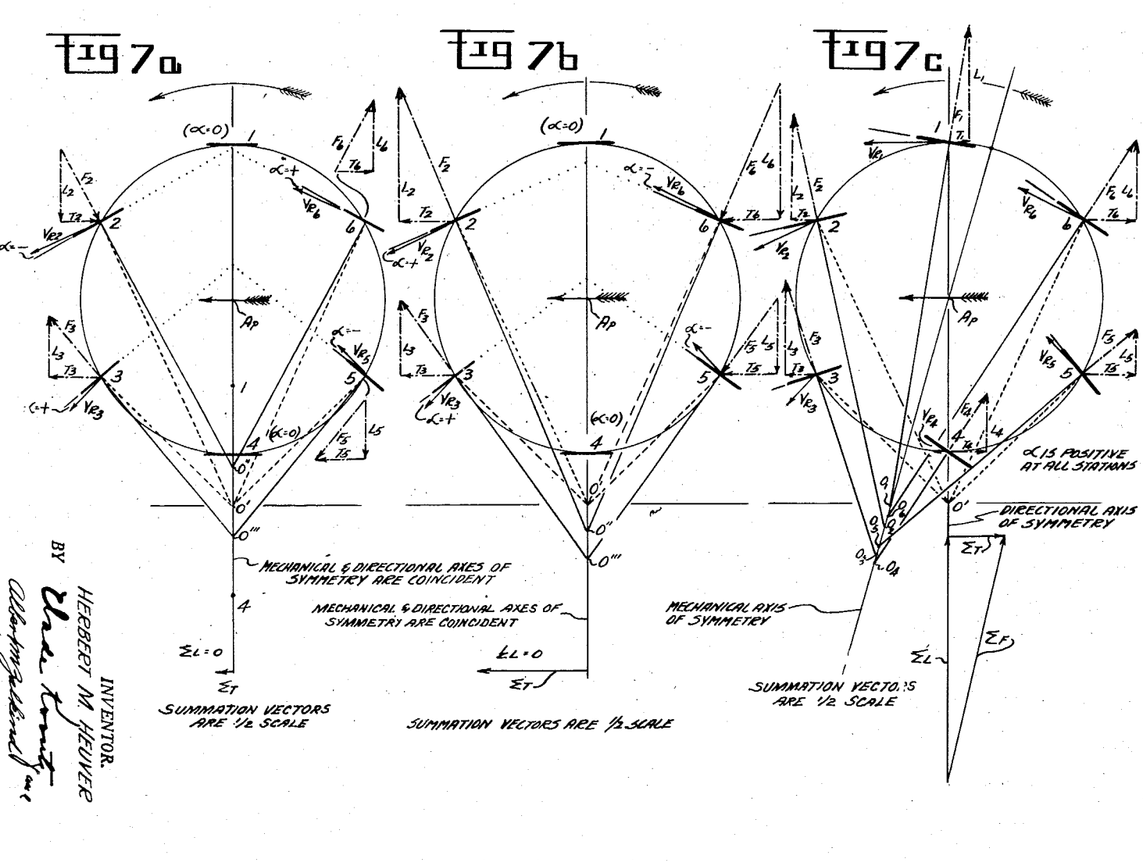
Figs. 7a, 7b and 7c are vector diagrams of airfoils having the motion provided by my pitch producing mechanism.
Figures 9A, 9B:
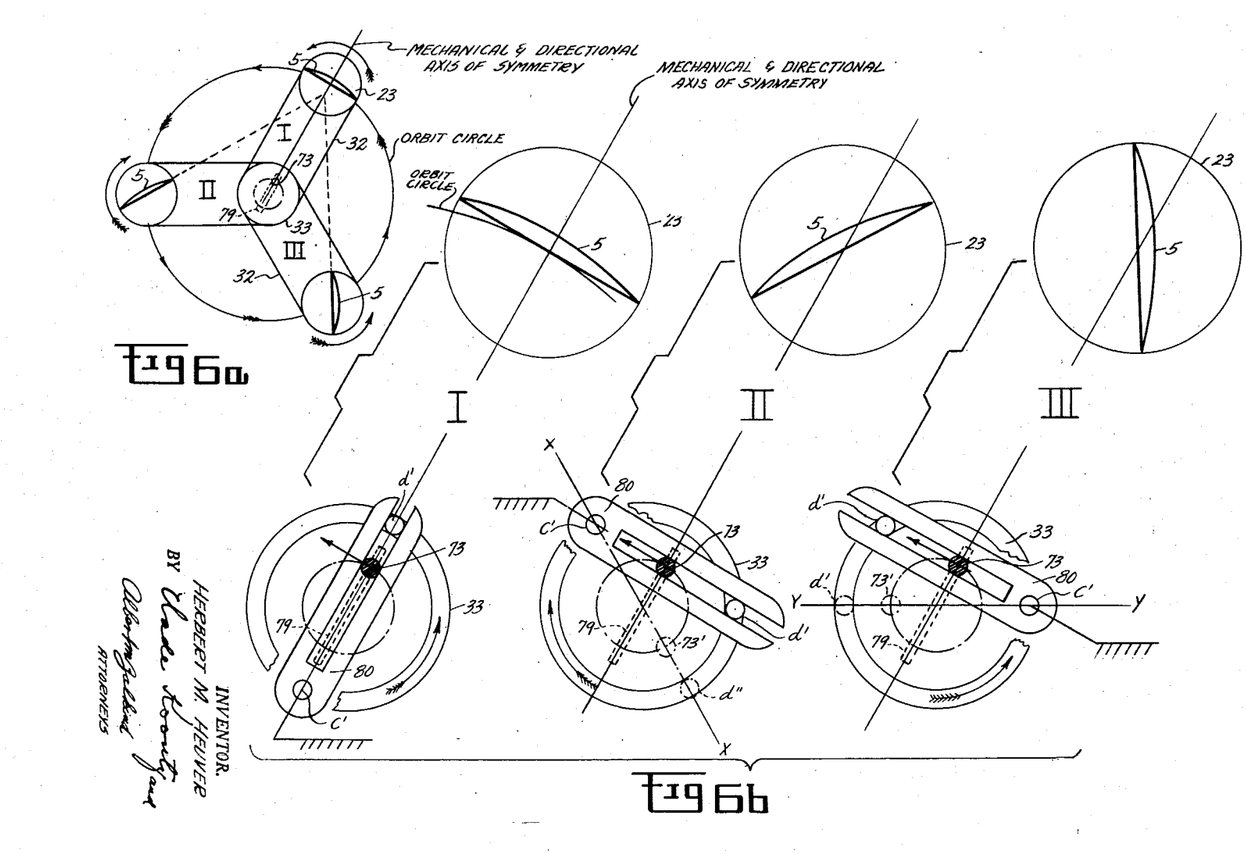

Attention is now invited to Figs. 7a, 7b and 7c which show vector diagrams of velocities and forces for a blade of a cycloidal propeller actuated by my novel mechanism. With particular reference to Fig. 7a, a blade, symbolized by the chord thereof, is shown at six stations about the orbit circle of a propeller. By comparison with Fig. 1a it will be noted that my mechanism gives a motion to the blade deviating somewhat for pure cycloidal motion for the reason that in Fig. 7a the mechanical instantaneous center for stations 2 and 6 is at point O" whereas the mechanical instantaneous center for stations 3 and 5 is at point O'''.

The center for station 1 would lie on the mechanical axis of symmetry somewhat above O", and the center for station 4 would lie somewhat lower on the axis than O''', but for simplicity these centers have been omitted in Figs. 7a and 7b, since discussion of stations 2, 3, 5 and 6 is ample for illustrative purposes. This effect of separating the instantaneous center is due to the nature of the mechanism comprising the lever 70 and the related links (Figs. 5, 5a) in each blade system and the equivalent mechanism of Fig. 6b would likewise produce the same effect. It will be noted, by comparison with Fig. 1a, that the instantaneous radii of mechanical rotation at stations 2 and 6 have been shortened whereas the corresponding radii at stations 3 and 5 have been lengthened. A novel result is thereby obtained, namely, the acceleration forces required to oscillate the blade and the acceleration stresses in the blade itself are increased at stations 2 and 6 but decreased at stations 3 and 5, as will be evident from consideration of the kinematics of Fig. 7a. Further, since the mechanical center for stations 2 and 6 has been moved upwardly, the chord angle of the blade with respect to the horizontal at stations 2 and 6 is decreased whereas the mechanical center of the blade at stations 3 and 5, having moved downwardly, the chord angle is increased. The resultant force on the propeller as a whole, however, as derived from the forces shown at the several stations, is such that the summation of lifts is equal to zero, whereas the summation of thrusts is forward for the velocities shown. It should be noted, however, that the instantaneous directional center O' has remained substantially unaffected by the displacement or splitting of the mechanical instantaneous centers. Attention is now called to Fig. 7b which differs from Fig. 7a in that the pitch has been increased to an extent such that the mechanical instantaneous center O" for the blade at stations 2 and 6 and the mechanical instantaneous center O''' for the blade at stations 3 and 5 has been further displaced along the mechanical axis of symmetry. In the condition shown in Fig. 7b, the radii to all stations have been increased as compared with Fig. 7a, but it will be noted that at the reduced pitch in Fig. 7a the ratio of the length of the radii to stations 3 and 5 with respect to the corresponding radii in Fig. 7b is larger than the ratio of the radii to stations 2 and 6 of Fig. 7a with respect to the corresponding radii of Fig. 7b. In other words, my mechanism effects a compromise in radii as between the stations in the lower part of the orbit circle in comparison with the stations in the upper part of the orbit circle such that as the chord angle is reduced, the acceleration forces are inversely affected; that is, the acceleration forces at the lower stations are not increased as much as are the forces at the upper stations. Accordingly, since the structure has inherently lower stresses at the upper stations due to the longer radii thereto, this feature effects a compromise in the apportionment of stresses which is advantageous in the practical operation of the mechanism and the blades. The summation of forces L and T is graphically shown on Fig. 7b and it will be noted that the change in pitch has not affected the lift but has increased the thrust in the direction of flight similar to the effect found for pure cycloidal motion as shown on Fig. 1a. In other words, the mechanical and directional axes of symmetry being coincident for both Figs. 7a and 7b, only the magnitude of oscillation of the blades has been affected by the change in pitch and it may now be noted by comparison of these two figures that the blades, if extended at stations 2 and 6 (or 3 and 5), would intersect on the normal to the blade at station 1, as heretofore stated in the discussion of Fig. 6a. With reference to Fig. 7c, it will be seen that the mechanical axis of symmetry has been shifted in a manner corresponding to Fig. 1c. Thus the phase of oscillation of the blade has been changed with respect to the several stations shown on the rotor circle and due to the peculiar nature of my mechanism each station now has an instantaneous mechanical center which falls substantially on the mechanical axis of symmetry and which are indicated as $O_1$ through $O_6$ to correspond with the subscript notation of the several stations. Here, again, it will be noted that stations 3, 4 and 5 in the lower half of the rotor circle have instantaneous centers which, though separated, are in each case lower than the instantaneous centers for stations 1, 2 and 6, thereby preserving the compromise effect insofar as acceleration stresses are concerned. The amount of angular displacement of the mechanical axis of symmetry from the directional axis of symmetry is, in the case of Fig. 7c, an extreme condition and results in a negative thrust for summation T and considerable positive lift in conformity with the effect achieved for the magnitude and phase conditions of Fig. 1c; that is, the aircraft, if under propulsive power, would be retarded, but if being towed as a glider would experience auto-rotation of the blades.

It will be apparent from the preceding description and with particular reference to Figs. 7a, 7b and 7c that the changes in pitch setting for the rotor are primarily related only to variations in thrust and that the lift obtained would be small in magnitude, so that a rotor of the kind described if provided with only a pitch change mechanism would be suitable only as a propulsion means and some additional sustention means would be necessary for the aircraft. By inspection of Fig. 7c however, it is apparent that by change in the phase angle of the blade oscillation or shift in the mechanical axis of symmetry the resultant force can be changed in direction so that it has a very large lift component and a zero or reverse thrust component.

By changing the pitch setting of the rotors simultaneously the thrust can be varied to change forward speed and by shift in the mechanical axis of symmetry the thrust can be converted to a lift of any desired magnitude so that the aircraft may be caused to descend, remain in level flight, or climb. By differentially changing the pitch of the pairs of rotors on opposite sides of the aircraft, yawing moments are created about the center of gravity to cause turning and differential shifting of the mechanical axes of symmetry between pairs of rotors on opposite sides of the aircraft and thus produce roll of the aircraft, while a differential change between fore and aft pairs of rotors produce pitching moments on the aircraft. The mechanisms for obtaining pitch change, for shifting the mechanical axis of symmetry and the control system for shifting the mechanical axis of pitch of the rotors will now be described.

The mechanism A' (Fig. 5) effects pitch adjustment by actuation of a pair of bevel gears 85 and 86, the gear 85 being integral with the screw 76 and the gear 86 being keyed to a shaft 89 having a pinion 91 keyed at the other end thereof and engaging the teeth of an internal gear 93 rotatably secured axially to the rotor by a ring 95 bolted to the rotor. Normally gear 93 rotates with the rotor and there is no relative motion between pinion 91 and gear 93. Ensuring rotation of gear 93 with the rotor is a compound gear 97 rotatively mounted on a shaft 98 but not keyed thereto. The larger gear of gear 97 engages gear 93 but has no connection with pinion 91 except by virtue of their individual engagement with gear 93. Pinion 91 and gear 97 have tooth lengths each of substantially one-half the length of the teeth of gear 93 so that for convenience of design pinion 91 and gear 97 may be disposed as shown in Figure 6 with relation to each other. The smaller diameter of gear 97 forms a central pinion for a sun and planet gear arrangement comprising a pair of planet gears 100 and 101 rotatably secured on a disc-like member 103 which is integral with the shaft 98. Rotatably mounted on shaft 98 is a cup-shaped gear 106 provided with internal and external teeth, the internal teeth being adapted to engage the planetary pinions 100 and 101 and the external teeth being adapted to engage the teeth of a gear 109 which may, as shown, be milled out of the material of shaft 37. Shaft 98 has keyed thereto a bevel gear 112 provided in a housing formed in the plate 39 and a bevel pinion 113 journalled in plate 39 is provided and adapted for manual rotation, so as to rotate gear 112 and shaft 98. The arrangement is such that rotation of the rotor by virtue of rotation of shaft 37 effects through gear 109 a rotation of gear 106 which is rotatable only about its own axis and which, in turn, causes rotation of pinions 100 and 101 about their own axes, thereby rotating gear 97 which is journalled on shaft 98, which in turn causes rotation of gear 93. The ratios provided among the several gears 93—109 is such that the larger gear of compound gear 97 causes rotation of gear 93 at the same R. P. M. as the rotor. However, when shaft 98 is rotated by virtue of the bevel gear combination 112 and 113, at the will of the operator, planetary pinions 100 and 101 are revolved about the axis of the shaft 98 and effect rotation of gear 97 which now rotates gear 93 faster or slower than the rotor, depending on the direction of revolution of pinions 100 and 101 about shaft 98. This relative rotation of gear 93 acting through pinion 91, shaft 89, gear arrangement 85 and 86 and screw 76 serves to translate nut 74 eccentrically of the axis of the rotor to adjust the pitch of the blades by effecting eccentricity of pin 73 as has heretofore been described.

It will be understood that eccentricity of pin 73 will ordinarily be provided in one direction only with respect to the propeller axis, due regard being had for the initial disposition of the mechanical axis of symmetry of the blades, so as to effect only forward thrust. Under certain conditions the ship could be made to fly backwards were pin 73 rendered eccentric on the opposite side of the propeller axis, but an analysis of this phenomenon is not thought necessary to a satisfactory disclosure of my invention.

The means for varying the mechanical axis of symmetry is the mechanism A'', as shown in Figs. 5 and 8, which comprises a gear 117 milled on the end of shaft 35 and engaging the smaller gear of a compound gear 120 which is rotatably supported on a shaft 122 suitably secured as by straps 124 and 125 on the shaft 37. The larger gear of compound gear 120 engages the smaller gear of another compound gear 128 rotatably secured in a similar manner on shaft 37, as shown only in Fig. 8. The larger gear of compound gear 128 is disposed for engagement with teeth provided internally of a worm gear 131, the exterior of which is provided with worm teeth adapted to engage a manually operable worm 134. Gear 131 and worm 134 are rotatably mounted within the stationary housing 40 in any suitable manner. For example, gear 131 could be journalled on shoulders 137 provided peripherally thereof, while worm 134 could be journalled at its ends in suitable bearings (not shown). As shaft 37 rotates with the rotor and gears 120 and 128 revolve therewith about the rotor axis, by virtue of the engagement of the larger gear of gear 128 with the internal teeth of the normally stationary worm gear 131, gear 128 is caused to rotate about its own axis which, in turn, causes rotation of gear 120 about its own axis. However, the ratios provided between the several gears is such that the rotation of the smaller gear of gear 120 about its own axis has a tangential velocity equal to and in an opposite direction with respect to the tangential velocity of revolution of gear 120 about the rotor axis. Accordingly, with gear 131 normally stationary, gear 120 rotates about its own axis and revolves about gear 117 thereby holding shaft 35 stationary relative to housing 40. When, however, worm 134 is manually operated thereby causing rotation of gear 131 and effecting rotation of gear 128, the rate of rotation of gear 120 is changed, i. e., it is increased or decreased depending on the direction of rotation of worm 134, thus causing rotation of gear 117 which compels rotation of shaft 35 in a direction depending upon the direction of rotation of worm 134 and to a proportional extent. Rotation of shaft 35 effects rotation of the integral lugs 62 which actuate their respective links and levers 70 to orient lugs 64 whereby sprockets 33 are angularly disposed at a predetermed position with respect to the propeller axis, and likewise the points c, which are normally fixed with respect to the aircraft, are revolved to a new position about the propeller axis, so that the straight line relationship of points c, d and 73 is preserved. The effect of this adjustment of sprockets 33 is to cause an equal angular displacement of the respective sprockets 23 about their own axes, thereby shifting the mechanical axis of symmetry of the propeller to directionally control the forces thereon, as demonstrated in Fig. 7c. It should be noted, with reference to Fig. 6b, that the pivots c', although shown as fixed to ground, i. e., fixed with respect to the aircraft could be arranged to be angularly positionable about the propeller axis whereby the mechanical axis of symmetry of the propeller could be varied.

In the complete cycloidal airplane manual operating means should be provided for actuation of the respective bevel pinions 113 (Fig. 5), so that equal or differential adjustment as between the left and right rotors is obtainable. Also manual operating means should be provided for actuation of the respective worms 134 in the control mechanisms A'', so that the mechanical axis of symmetry of the four propellers may be varied jointly or differentially.

From the above description it will be appreciated that I have provided a cycloidal airplane and control system therefor, whereby manual controls in the airplane can effect complete control of the airplane by adjustment of the several rotors or propellers. It should be understood that the airplane is not limited to the exact number of rotors shown and that any multiple of four rotors could be used to obtain the control effects in the manner taught herein without departing from the spirit of the invention.

The term pitch as used in the foregoing discussion of the operation of the rotors and airplane is only the theoretical pitch as it is influenced by the relative setting of the rotor blades and their relative motion during a particular cycle of operation. The actual rotor pitch in an airplane built in accordance with the principles outlined herein will depend on numerous additional factors, such as the cross sectional shape of the rotor blades, the number of blades per rotor, the diameter of the rotor in relation to the blade chord, the number and relative disposition of the rotors on each side of the airplane, the magnitude and direction of winds and the forward speed of the airplane with respect to the surrounding air. All these considerations will influence the actual pitch of the rotors as well as the instantaneous center of rotation of each rotor but these considerations are variables only determinable by design, accuracy of construction and operating conditions.

Although many of the structural details of my invention have been omitted for the sake of more clearly emphasizing that structure which I regard as novel, it will be understood that such details may readily be supplied by persons skilled in the art and that the invention as disclosed represents the basic structure for purposes of illustration, and I seek patent protection therefor within the scope of the claims appended hereto.

I claim:

1. A cycloidal propeller for aircraft comprising, a rotatably mounted rotor having a plurality of blades extending therefrom in generally parallel relation and rotatable with said rotor, means mounting each of said blades for rotation about its longitudinal axis relative to said rotor, a control mechanism for regulating the rotative positions of said blades with respect to said rotor including first sprocket members coaxial of said blades and second sprocket members coaxial of said rotor and said first sprocket members being fixed on the respective blades, independent chain drive means connecting the respective first and second sprocket members, a pin near the axis of rotation of said rotor and rotatable with said rotor, means for adjusting the position of said pin from a coaxial to an eccentric position relative to said rotor, a lever means rotatably mounted on said pin and having oppositely extending portions extending radially therefrom, similar pairs of links for connecting each of said second sprocket members to one oppositely extending lever portion and for connecting the other oppositely extending lever portion to a relatively stationary element spaced radially outwardly from said pin and said lever means.

2. A cycloidal propeller for aircraft comprising, a rotatably mounted rotor having a plurality of blades extending therefrom in generally parallel relation and rotatable with said rotor, means mounting each of said blades for rotation about its longitudinal axis relative to said rotor, a control mechanism for regulating the rotative positions of said blades with respect to said rotor including first sprocket members coaxial of said blades and second sprocket members coaxial of said rotor and said first sprocket members being fixed on the respective blades, independent chain drive means connecting the respective first and second sprocket members, a pin near the axis of rotation of said rotor and rotatable with said rotor, means for adjusting the position of said pin from a coaxial to an eccentric position relative to said rotor, a lever means rotatably mounted on said pin and having oppositely extending portions extending radially therefrom, a round cup-like housing around said pin and lever means serving as a bearing for said second sprocket members, shaft means integral with said cup-like housing, means for rotatably adjusting said shaft through a limited range, similar pairs of links for connecting each of said second sprocket members to one oppositely extending lever portion and for connecting the other oppositely extending lever portion to the inside surface of cup-like housing.

3. In an aircraft of the class described, a cycloidal propeller comprising a rotatably mounted rotor, a plurality of propeller blades rotatably mounted on said rotor in equally spaced relation from the axis of rotation of said rotor with their longitudinal axes parallel to each other and to the axis of rotation of said rotor, means for rotating said rotor about the axis of rotation thereof, means for rotating said blades about their longitudinal axes at the same time said rotor is rotated including relatively stationary members located centrally of said rotor and motion transmitting means extending from said relatively stationary members to said blades, an adjustable eccentric pin near the axis of rotation of said rotor, a lever for each relatively stationary member mounted on said pin for oscillatory rotation thereon, and similar pairs of links with each pair connected respectively between diametrically opposite sides of said one of said levers, one of said relatively stationary members and a lug rigidly connected to a normally stationary member, whereby said relatively stationary members are oscillated to a limited degree during each revolution of said rotor.

4. In a driving and control mechanism for a cycloidal propeller, a rotor member, blades rotatably secured on said rotor member in equally spaced relation from the axis of rotation of said rotor with their longitudinal axes parallel to each other and to the axis of rotation of said rotor, a hollow drive shaft operatively connected to said rotor member to effect rotation thereof, a control shaft coaxially disposed within said drive shaft, means operatively connecting said control shaft and blades to effect angular orientation of said blades by rotation of said control shaft, a first gear rotatably supported on said drive shaft and having its axis radially spaced from the axis thereof whereby said first gear revolves bodily about the axis of said drive shaft, a manually rotatable normally stationary gear, said first gear being a compound gear having two peripheral portions of different diameters with one of said portions engaging said normally stationary gear, a second gear supported for rotation on said drive shaft and having its axis radially spaced from the axis thereof whereby said second gear revolves bodily about the axis of said drive shaft, said second gear being a compound gear having two peripheral portions of different diameters with one of said portions being adapted to engage the other peripheral portion of said first gear, a driven gear fixed coaxially on said control shaft and engaging the other peripheral portion of said second gear, the ratios of the several gears being such that said second gear rotates said control shaft at the same angular velocity but in opposite sense as said drive shaft to normally hold said control shaft stationary, whereby rotation of said manually rotatable gear is operative through said first and second gears to rotate said control shaft.

HERBERT M. HEUVER.

REFERENCES CITED

The following references are of record in the file of this patent:

UNITED STATES PATENTS

| Number | Name | Date |
|---|---|---|
| 1,055,455 | Esson | Mar. 11, 1913 |
| 1,069,880 | Kasmar | Aug. 12, 1913 |
| 1,252,195 | Study | Jan. 1, 1918 |
| 1,284,851 | Ashworth | Nov. 12, 1918 |
| 1,414,577 | Nemeth | May 2, 1922 |
| 1,432,700 | Kirsten | Oct. 17, 1922 |
| 1,544,134 | David | June 30, 1925 |
| 1,576,641 | Beekley | Mar. 16, 1926 |
| 1,795,501 | Platt | Mar. 10, 1931 |
| 2,045,233 | Kirsten et al. | June 23, 1936 |
| 2,090,052 | Kirsten | Aug. 17, 1937 |
| 2,123,916 | Rohrbach | July 19, 1938 |
| 2,364,635 | Hasler | Dec. 12, 1944 |